(12) United States Patent
Fulks

(10) Patent No.: US 6,554,305 B2
(45) Date of Patent: Apr. 29, 2003

(54) SELF-CENTERING VEHICLE ROLL CONTROL SYSTEM

(75) Inventor: Gary C. Fulks, Spring Valley, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/886,422

(22) Filed: Jun. 21, 2001

(65) Prior Publication Data

US 2002/0195790 A1 Dec. 26, 2002

(51) Int. Cl.⁷ .............................................. B60G 21/10
(52) U.S. Cl. ................. 280/124.107; 267/188; 74/527
(58) Field of Search .................. 280/124.107, 124.137, 280/124.152, 124.166; 267/188, 273, 277; 74/527, 569

(56) References Cited

U.S. PATENT DOCUMENTS

| | | | |
|---|---|---|---|
| 3,774,470 A | * | 11/1973 | Cottin .......................... 74/527 |
| 4,010,941 A | * | 3/1977 | Kirkland ...................... 267/273 |
| 4,206,935 A | | 6/1980 | Sheppard et al. |
| 4,359,105 A | * | 11/1982 | Van Natta .................... 172/386 |
| 5,749,596 A | | 5/1998 | Jensen et al. |

FOREIGN PATENT DOCUMENTS

| | | | |
|---|---|---|---|
| GB | 2 046 973 | * | 11/1980 |
| GB | 2284184 | | 5/1995 |

* cited by examiner

*Primary Examiner*—Peter C. English
(74) *Attorney, Agent, or Firm*—Scott A. McBain

(57) ABSTRACT

A vehicle roll control system including a torsion bar having a longitudinal axis and first and second end portions disposed along the longitudinal axis. A first arm includes a passive end fixed to the first end of the torsion bar and extending transverse to the longitudinal axis. A second arm is provided having an active end rotatably coupled to the second end portion of the torsion bar and also extending transverse to the longitudinal axis. The opposite ends of the first and second arms are each configured to couple to the vehicle chassis. An actuator including a cam locking element is provided for selectively locking and unlocking the active end of the second arm to thereby selectively prevent and allow rotation of the active arm relative to the torsion bar.

12 Claims, 2 Drawing Sheets

SELF-CENTERING VEHICLE ROLL CONTROL SYSTEM

FIELD OF THE INVENTION

The present invention generally relates to automotive roll control systems and, more specifically, to roll control systems which may be selectively locked and unlocked for use in selective roll control.

BACKGROUND OF THE INVENTION

Various prior patents have addressed the challenges related to existing automotive roll control systems. As examples, U.S. Pat. No. 5,362,094 (the '094 patent) discloses a hydraulic control for a stabilizer bar system. Another hydraulic system is disclosed in U.S. Pat. No. 5,749,596 (the '596 patent). The system disclosed in the '094 patent is effective, however, the system is also relatively complex as it requires double acting hydraulic cylinders, valves, manifold blocks and various conduit lines. The system disclosed in the '596 patent also includes a hydraulic actuator and somewhat simplifies the system and reduces the number of required components. UK published patent application GB 2,284,184 discloses a similar roll control system using a hydraulic actuator.

Despite the improvements made in this area of technology, prior systems used to selectively apply roll control are bulky and, therefore, may not be easily incorporated in various vehicles depending on space availability. In addition, prior systems have not had the ability to control the roll axis both actively and semi-actively or to self-center the roll axis without the use of complex electronics and sensors.

For these general reasons, additional improvements are necessary in this technology relative to providing an even more compact and cost efficient system with greater capabilities.

SUMMARY OF THE INVENTION

The present invention therefore generally provides a vehicle roll control system including a torsion bar having a longitudinal axis and first and second end portions disposed generally along the longitudinal axis. A first arm or passive arm has a passive end fixed to the first end portion of the torsion bar and extends transverse to the longitudinal axis. This first arm rotates with the torsion bar. The first arm further includes an opposite end configured to be coupled to the vehicle chassis. A second arm or active arm includes an active end rotatably coupled to the second end portion of the torsion bar and extending transverse to the longitudinal axis. This second arm, in accordance with the invention, can either rotate with respect to the torsion bar or be locked for rotation with the torsion bar. The second arm also includes an opposite end configured to be coupled to the vehicle chassis.

In a preferred embodiment, an actuator is mounted to the second arm. The actuator includes a driven member movable between first and second positions with respect to the active end of the second arm. The first position allows rotation of the second arm at the active end relative to the second end portion of the torsion bar and the second position locks the active end to prevent rotation thereof relative to the second end of the torsion bar. In the preferred embodiments, the driven member moves linearly between the first and second positions and the actuator may be hydraulic, electric, pneumatic or combinations thereof. One of the driven member and the active end includes a cam surface, while the other includes a cam follower. The cam follower moves along the cam surface when the driven member is in the first position and the cam follower is locked against the cam surface when the driven member is in the second position.

More preferably, the cam follower is in a centered position on the cam surface when the driven member is in the second position and the cam follower can move in opposite, noncentered directions when the driven member is in the first position. Therefore, when the driven member is moved by the actuator to the second position, this drives the cam follower and the second arm to the centered position. In this centered and locked position, driving conditions such as cornering and non-level surfaces will twist the anti-roll bar and applies a force to the vehicle chassis that increases the overall spring stiffness between the chassis and the vehicle body, such as during corning or off-road conditions. In the first position or unlocked position of the driven member, when the anti-roll bar is twisted, little or no force is transmitted to the vehicle chassis to alter the normal spring rate of the suspension. Moreover, when one wheel is deflected relative to an opposite wheel, the actuator may be selectively actuated to drive the cam follower to the centered position thereby tending to level the vehicle between the two wheels. Additionally, the cam follower will tend to self-center along the cam surface to maintain the two arms in a level plane.

Various additional objectives, advantages and features of the invention will become more readily apparent to those of ordinary skill in the art upon review of the following detailed description of the preferred embodiments taken in conjunction with the accompanying drawings.

DETAILED DESCRIPTION OF THE PREFERRED EMBODIMENTS

Figure 1:
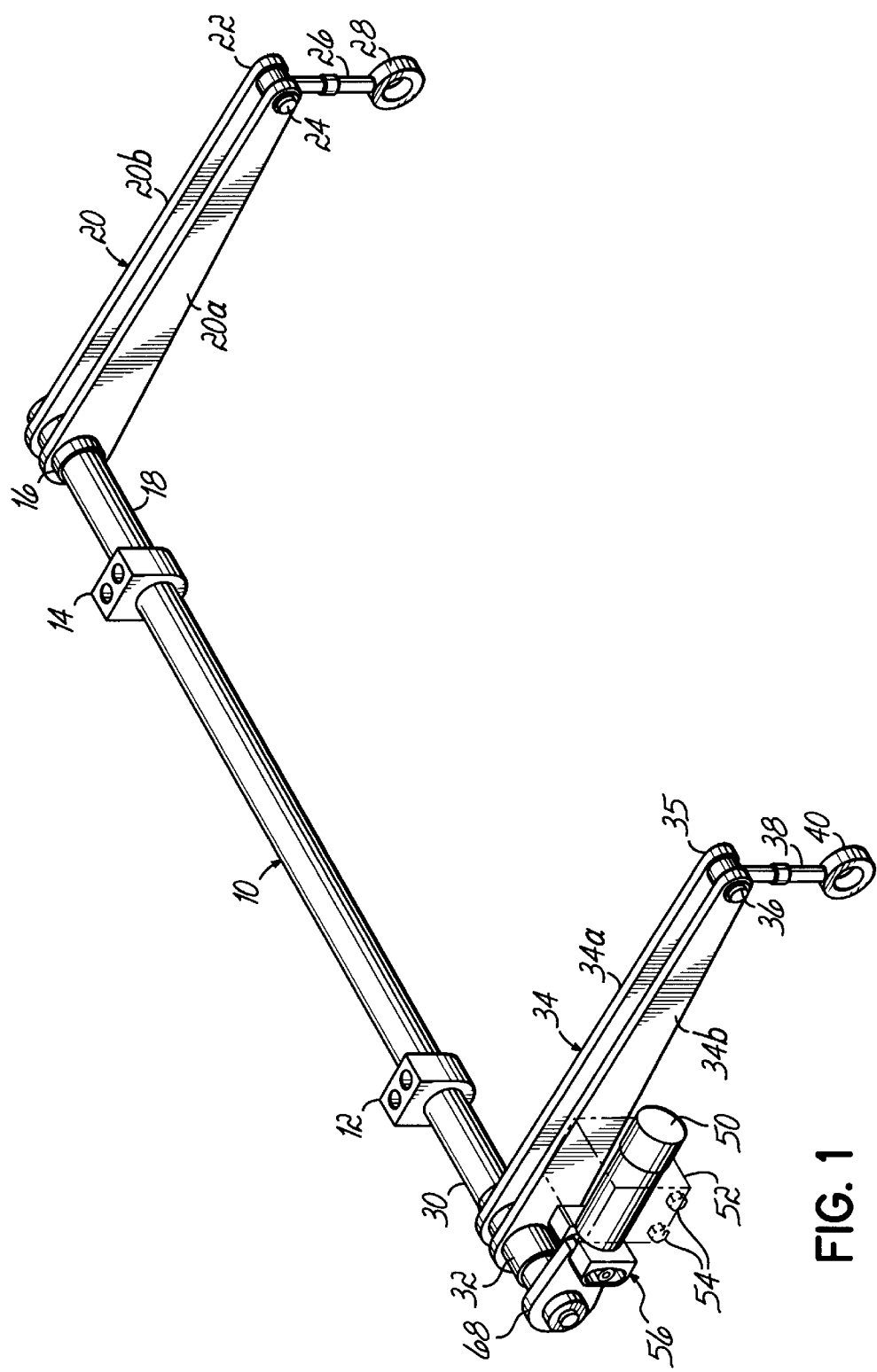
FIG. 1 is a perspective view of a first embodiment of the invention.

Referring generally to FIG. 1, one preferred embodiment of the invention comprises a roll control system including a torsion bar 10 configured to be carried on a vehicle body (not shown) by bushings 12, 14. Torsion bar 10 is rotatable within bushings 12, 14. A passive hub 16 connects an end portion 18 of torsion bar 10 to a passive arm 20 comprised of respective plates 20a, 20b, as is generally conventional. Passive hub 16 provides a rigid connection between passive arm 20 and end portion 18 of torsion bar 10. That is, arm 20 rotates with torsion bar 10. The opposite end 22 of arm 20 is connected via a pivot joint 24 to a connecting rod 26 carrying a suitable fitting 28 at its opposite end for attachment to the vehicle chassis (not shown).

An opposite end portion 30 of torsion bar 10 includes an active hub 32 rotatably coupled to an end of an active arm 34 again comprised of separate plate elements 34a, 34b. An opposite end 35 of arm 34 includes a pivot joint 36 to pivotally couple end 35 to a connecting rod 38. The opposite end of connecting rod 38 again includes a suitable fitting 40 for connection to the vehicle chassis (not shown). An actuator 50 is provided and rigidly mounted by a suitable mounting member 52 and fasteners 54 to active arm 34. Actuator 50 is coupled with a drivable and self-centering cam locking device 56 for purposes as described below.

Figure 2A:
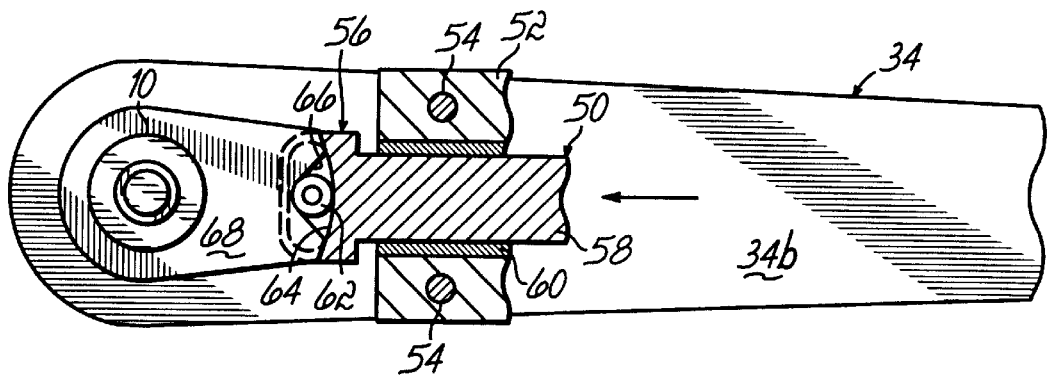
FIG. 2A is a partially cross sectioned view illustrating the interaction between the driven member and the active end of the second arm in the centered and locked position.
Figure 2B:
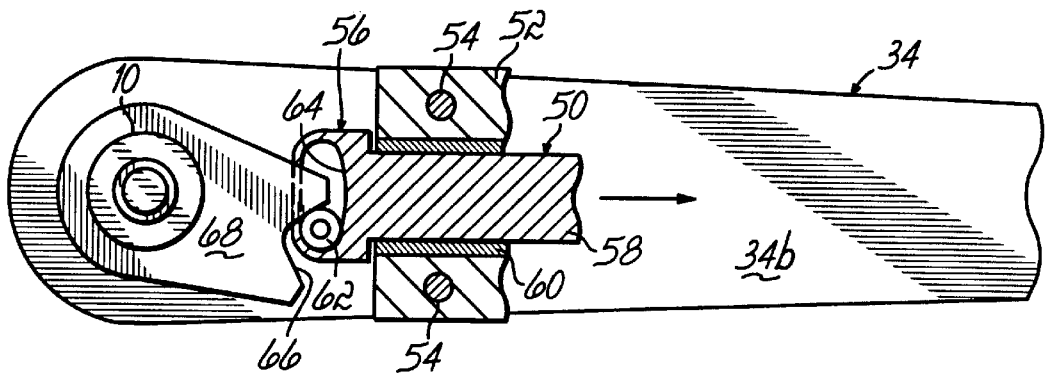
FIGS. 2B and 2C are partial cross sectional views similar to FIG. 2A, but illustrating the driven member in the unlocked position thereby allowing rotation of the torsion bar relative to the second arm.
Figure 2C:
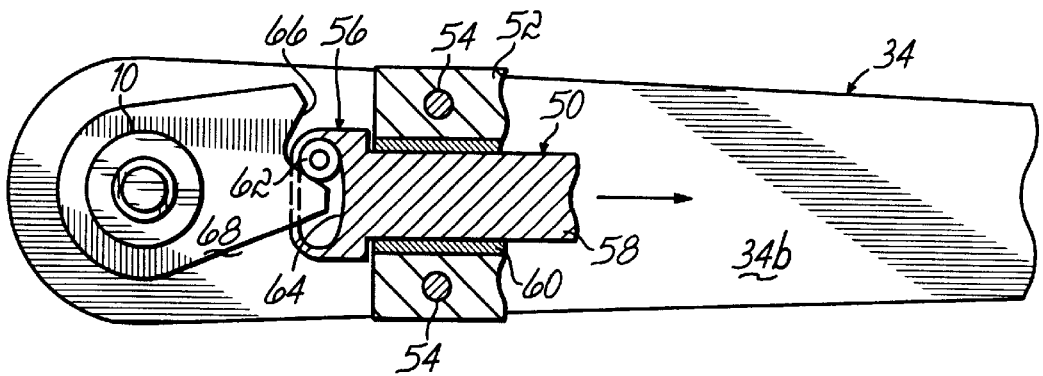

Referring now to FIGS. 2A–2C cam locking device 56 more specifically includes a member 58 driven preferably in a linear manner within a bushing 60 of actuator 50. Actuator 50 may be an electric, hydraulic, pneumatic or other type of drive mechanism and is only diagrammatically shown for clarity. As one example, hydraulic pressure may be derived from a motorized ball screw device and this pressure may be used to selectively drive and release member 58. Driven member 58 carries a cam follower 62 within a curved slot 64 and cam follower 62 is trapped within slot 64 by a cam surface 66 formed at the end of a plate 68 which is rigidly affixed to torsion bar 10 and rotates therewith. Driven member 58 is shown in the actuated or locked position in FIG. 2A. In this position, cam follower 62 is forced toward plate 68 and into a central recessed position on cam surface 66. In this position, arm 34 and torsion bar 10 are prevented from rotating with respect to each other.

In FIGS. 2B and 2C, driven member 58 is shown in the unlocked position retracted to the right or away from plate 68 such that cam follower 62 is now free to move from one end of slot 64 to the other while riding along cam surface 66 during rotation of torsion bar 10 relative to arm 34.

When one wheel is deflected upward or downward relative to an opposite wheel, such as during cornering or off-road conditions, and driven member 58 is in the locked position shown in FIG. 2A, torsion bar 10 will twist and a force will be applied to the vehicle chassis which increases the overall spring stiffness between the chassis and the vehicle body. When the driven member 58 is in the unlocked position shown in FIGS. 2B and 2C, and the same type of condition is experienced, little or no force will be transmitted to the vehicle chassis to alter the normal spring rate of the suspension. In addition, when torsion bar 10 (or arm 34) is in the deflected position shown in FIGS. 2B or 2C, driven member 58 may be positively moved to the locked position by actuator 50, as shown in FIG. 2A, to level the vehicle body. In addition, a predetermined constant force may be applied to driven member 58 such that cam follower 62 is biased toward the center position of cam surface 66. This will provide a self-centering function for torsion bar 10 and arm 34 and, therefore, provide a self-leveling system for the vehicle.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein I claim:

1. A vehicle roll control system comprising:
    a torsion bar having a longitudinal axis and first and second end portions disposed generally along the longitudinal axis;
    a first arm having a passive end fixed to said first end portion of said torsion bar and extending transverse to said longitudinal axis;
    a second arm having an active end rotatably coupled to said second end portion of said torsion bar and extending transverse to said longitudinal axis;
    a locking member affixed for rotation with said second end portion of said torsion bar, said locking member including a cam surface; and
    an actuator mounted on said second arm, said actuator including a driven member movable between first and second positions with respect to said cam surface of said locking member, said first position allowing rotation of said second arm at said active end relative to said second end portion of said torsion bar and said second position locking said active end to prevent rotation thereof relative to said second end of said torsion bar.

2. The vehicle roll control system of claim 1, wherein said driven member moves in a linear manner between said first and second positions.

3. The vehicle roll control system of claim 1, wherein said driven member further comprises a linear drive member including a slot and a cam follower movable within said slot, said cam follower capable of moving along said slot and said cam surface when said driven member is in said first position and said cam follower is locked in a position within said slot and against said cam surface when said driven member is in said second position.

4. The vehicle roll control system of claim 1, wherein said cam surface includes a centrally recessed area defining a level condition of the vehicle.

5. The vehicle roll control system of claim 1, wherein the locking member further comprises a plate having an edge defining said cam surface.

6. A self-centering vehicle roll control system comprising:
    a torsion bar having a longitudinal axis and first and second end portions disposed generally along the longitudinal axis;
    a first arm having a passive end fixed to said first end portion of said torsion bar and extending transverse to said longitudinal axis;
    a second arm having an active end rotatably coupled to said second end portion of said torsion bar and extending transverse to said longitudinal axis; and
    an actuator mounted on said second arm and including a first cam element movable between first and second positions with respect to a second cam element coupled with said second end portion of said torsion bar, said first position allowing said first cam element to move between a centered position relative to said second cam element and opposite non-centered positions to thereby allow rotation of said second arm at said active end in opposite directions relative to said second end portion of said torsion bar, wherein movement of said first cam element to said second position drives said first cam element from one of said non-centered positions to said centered position thereby locking said first cam element with respect to said second cam element to lock said active end and thereby prevent rotation thereof relative to said second end portion of said torsion bar.

7. The self-centering vehicle roll control system of claim 6, wherein said first cam element is driven in a linear manner.

8. The self-centering vehicle roll control system of claim 6, wherein said first cam element is a cam follower and said second cam element is a cam surface upon which said cam follower rides.

9. The self-centering vehicle roll control system of claim 8, wherein said cam follower is movable within a slot, said cam follower capable of moving within said slot and along said cam surface when said cam follower is in said first position and said cam follower is locked in a position within said slot and against said cam surface when said cam follower is in said second position.

10. An actuator for use in a vehicle roll control system, the actuator adapted to be mounted adjacent an active arm and a torsion bar of the vehicle roll control system, comprising:

a driven member movable between first and second positions, a first cam element on said driven member, said first cam element capable of moving with respect to a second cam element coupled with the torsion bar when the driven member is in said first position to thereby allow relative rotation between the active arm and the torsion bar, and said first cam element adapted to be locked in position relative to the second cam element when said driven member is moved to said second position to thereby lock the active arm and prevent rotation thereof relative to the torsion bar, wherein said driven member further includes a slot, and said first cam element further comprises a cam follower, said cam follower being retained for movement within said slot.

11. The actuator of claim 10, wherein said driven member further comprises a linear driven member configured to be mounted on the active arm of the vehicle roll control system.

12. The actuator of claim 10, wherein said slot is curved and said cam follower is movable between first and second closed ends of said slot.

\* \* \* \* \*